(12) United States Patent
Svensson et al.

(10) Patent No.: US 12,422,008 B2
(45) Date of Patent: Sep. 23, 2025

(54) WHEEL BRAKE ARRANGEMENT

(71) Applicant: Volvo Truck Corporation, Gothenburg (SE)

(72) Inventors: Lars Svensson, Gothenburg (SE); Martin Petersson, Sävedalen (SE); Kent Augustsson, Bollebygd (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/616,367

(22) Filed: Mar. 26, 2024

(65) Prior Publication Data

US 2024/0229879 A1     Jul. 11, 2024

Related U.S. Application Data

(63) Continuation of application No. 17/416,231, filed as application No. PCT/EP2018/085599 on Dec. 18, 2018, now Pat. No. 11,971,077.

(51) Int. Cl.
| | | |
|---|---|---|
| *F16D 65/097* | (2006.01) | |
| *F16D 55/226* | (2006.01) | |
| *F16D 55/00* | (2006.01) | |
| *F16D 65/02* | (2006.01) | |

(52) U.S. Cl.
CPC ....... *F16D 65/0979* (2013.01); *F16D 55/226* (2013.01); *F16D 2055/0029* (2013.01); *F16D 2055/007* (2013.01); *F16D 2065/1396* (2013.01)

(58) Field of Classification Search
CPC ............. F16D 65/0976; F16D 65/0979; F16D 55/226; F16D 2065/1396; F16D 2055/0029; F16D 2055/007; F16F 2055/0029; F16F 2055/007

See application file for complete search history.

(56) References Cited

U.S. PATENT DOCUMENTS

| | | |
|---|---|---|
| 4,290,508 A | 9/1981 | Baum |
| 4,364,455 A | 12/1982 | Oshima |
| 4,527,669 A | 7/1985 | Meyer et al. |
| 4,537,291 A | 8/1985 | Thiel et al. |
| 5,111,914 A | 5/1992 | Thiel et al. |
| 11,649,864 B2 | 5/2023 | Philpott et al. |
| 11,703,096 B2 | 7/2023 | Denhard et al. |
| 11,773,932 B2 | 10/2023 | Fumagalli et al. |
| 2002/0043436 A1 | 4/2002 | Burgdorf et al. |

(Continued)

FOREIGN PATENT DOCUMENTS

| | | |
|---|---|---|
| CN | 101035997 A | 9/2007 |
| CN | 101107456 A | 1/2008 |

(Continued)

OTHER PUBLICATIONS

Non-Final Office Action for U.S. Appl. No. 17/416,231, mailed Nov. 6, 2023, 12 pages.

(Continued)

*Primary Examiner* — Bradley T King
(74) *Attorney, Agent, or Firm* — Withrow & Terranova, PLLC

(57) ABSTRACT

A wheel brake arrangement for a wheel of a vehicle, the wheel brake arrangement comprising a retainer bar and a resilient member connected between the retainer bar and a brake pad arrangement of the wheel brake arrangement.

14 Claims, 5 Drawing Sheets

(56) References Cited

U.S. PATENT DOCUMENTS

| | | |
|---|---|---|
| 2003/0192749 A1 | 10/2003 | Barbosa et al. |
| 2004/0016610 A1 | 1/2004 | Morris |
| 2004/0026184 A1 | 2/2004 | Baumann et al. |
| 2007/0246312 A1* | 10/2007 | Bach ................... F16D 65/0972 188/73.31 |
| 2007/0272501 A1* | 11/2007 | Weiler ................ F16D 65/0978 188/73.38 |
| 2008/0110703 A1 | 5/2008 | Reuter et al. |
| 2008/0135351 A1 | 6/2008 | Kirschner et al. |
| 2012/0186917 A1 | 7/2012 | Gutelius |
| 2013/0025981 A1 | 1/2013 | Maehara et al. |
| 2014/0339026 A1 | 11/2014 | Gutelius et al. |
| 2016/0102722 A1 | 4/2016 | Foucoin |
| 2016/0116009 A1 | 4/2016 | Falter et al. |
| 2016/0146278 A1 | 5/2016 | Roberts |
| 2016/0160945 A1 | 6/2016 | Gasslbauer |
| 2018/0106309 A1 | 4/2018 | Fricke et al. |
| 2018/0106313 A1 | 4/2018 | Fricke et al. |
| 2018/0223921 A1 | 8/2018 | Krause et al. |
| 2019/0056000 A1 | 2/2019 | Beyer et al. |
| 2019/0085918 A1 | 3/2019 | Fischl et al. |
| 2019/0249731 A1 | 8/2019 | Demorais et al. |
| 2020/0149602 A1 | 5/2020 | Lethorn |
| 2020/0182316 A1 | 6/2020 | Zenzen et al. |
| 2020/0355232 A1 | 11/2020 | Adkins et al. |
| 2021/0206355 A1 | 7/2021 | Petschke et al. |
| 2021/0246952 A1 | 8/2021 | Adkins et al. |
| 2021/0356006 A1* | 11/2021 | D'Alessio ........... F16D 65/0068 |
| 2022/0049747 A1 | 2/2022 | Cleary et al. |
| 2022/0074456 A1 | 3/2022 | Svensson et al. |
| 2022/0163080 A1* | 5/2022 | Welin ................. F16D 65/0979 |
| 2022/0290727 A1* | 9/2022 | Svensson ............ F16D 65/0978 |
| 2023/0067490 A1 | 3/2023 | Dorn et al. |
| 2023/0108312 A1 | 4/2023 | Palmgren et al. |
| 2023/0109487 A1 | 4/2023 | Crippa et al. |
| 2023/0151858 A1 | 5/2023 | Berghaus et al. |
| 2023/0265902 A1 | 8/2023 | Sakhare et al. |

FOREIGN PATENT DOCUMENTS

| | | | |
|---|---|---|---|
| CN | 102011816 A | 4/2011 | |
| CN | 107178568 A | 9/2017 | |
| CN | 108700146 A | 10/2018 | |
| DE | 10351477 A1 | 6/2005 | |
| DE | 102016004516 A1 | 10/2017 | |
| DE | 102016120478 A1 | 5/2018 | |
| DE | 102016120481 A1 | 5/2018 | |
| DE | 102016124310 A1 | 6/2018 | |
| WO | 2006077227 A1 | 7/2006 | |
| WO | 2017178096 A1 | 10/2017 | |
| WO | WO-2018054825 A1 * | 3/2018 | ........... F16D 55/226 |
| WO | 2018077728 A1 | 5/2018 | |
| WO | 2018077785 A1 | 5/2018 | |

OTHER PUBLICATIONS

Notice of Allowance for U.S. Appl. No. 17/416,231, mailed Feb. 16, 2024, 7 pages.
Supplemental Notice of Allowability for U.S. Appl. No. 17/416,231, mailed Mar. 18, 2024, 3 pages.
First Office Action for Chinese Patent Application No. 201880100226.5, mailed Jul. 28, 2022, 21 pages.
Extended European Search Report for European Patent Application No. 21201581.2, mailed Dec. 10, 2021, 7 pages.
International Search Report and Written Opinion for International Patent Application No. PCT/EP2018/085599, mailed Sep. 9, 2019, 14 pages.
International Preliminary Report on Patentability for International Patent Application No. PCT/EP2018/085599, mailed Sep. 24, 2020, 26 pages.

* cited by examiner

WHEEL BRAKE ARRANGEMENT

PRIORITY APPLICATIONS

The present application is a continuation of U.S. patent application Ser. No. 17/416,231, filed on Jun. 18, 2021 and issued as U.S. Pat. No. 11,971,077, which is a 35 U.S.C. § 371 national phase filing of International Application No. PCT/EP2018/085599, filed Dec. 18, 2018, the disclosures of which are incorporated herein by reference in their entireties. Priority is claimed to each of the aforementioned applications.

TECHNICAL FIELD

The present disclosure relates to a wheel brake arrangement. The wheel brake arrangement is applicable on vehicles, in particularly low, medium and heavy duty vehicles commonly referred to as trucks. Although the wheel brake arrangement will mainly be described in relation to a truck, it may also be applicable for other types of vehicles comprising wheel brakes in the form of disc brakes.

BACKGROUND

In connection to vehicles in the form trucks, also known as low-, medium and heavy duty vehicles, there is always a high demand on the wheel brakes. These demands relate in particular to the braking capability of the wheel brake as they need to function properly in order to reduce vehicle speed properly.

Typically, the wheel brake comprises a brake disc connected to a wheel hub, which in turn is connected to a wheel of the vehicle. The wheel brake further comprises brake pads which are arranged to provide a brake action against the brake disc, i.e. clamp against the brake disc, such that a rotation speed of the wheel is reduced. The brake disc will thus slip against the brake pads until the wheel has stopped its motion. This creates frictional heat in the brake disc which needs to be taken care of. The brake pads are in turn connected to a carrier arranged to support the brake pad and keep it in its correct position.

US 2016/0160945 describes a brake disc arrangement comprising a brake disc and two brake pads arranged on opposite sides of the brake disc for providing a braking action thereof. In particular, US 2016/0160945 describes the use of a pad holding spring which is arranged to prevent the brake pad from being twisted during operation. The pad holding spring is thus arranged to prevent a radial movement of the brake pad, and is spanned centrally by a pad holding bracket, which pad holding bracket extends axially with respect to the axis of rotation of the brake disc.

However, with the brake disc arrangement in US 2016/0160945, there is a risk that the brake pads are not sufficiently removed from the brake disc after a braking event, which may cause drag losses increasing the fuel consumption, and increased wear of the brake pads. There is thus a desire to improve the brake disc arrangement for e.g. increasing the operational life time of its components as well as reducing the fuel consumption generated by the drag losses.

SUMMARY

It is an object of the present disclosure to provide a wheel brake arrangement which at least partially overcomes the above described deficiencies. This is achieved by a wheel brake arrangement according to claim 1.

According to a first aspect, there is provided a wheel brake arrangement for a wheel of a vehicle, the wheel brake arrangement comprising a brake pad arrangement comprising a brake pad; a brake disc connectable to a wheel of the vehicle for reducing the speed of the vehicle when the brake pad is pressed against the brake disc; a caliper, at least partially housing the brake pad arrangement and the brake disc; and a retainer bar connected to the caliper, the retainer bar extending across the brake pad arrangement and the brake disc in an axial direction of the wheel brake arrangement, wherein the retainer bar is disconnectable from the caliper; wherein the wheel brake arrangement further comprises a resilient member connected to the brake pad arrangement and to the retainer bar, the resilient member being tensioned when the brake pad is pressed against the brake disc for urging the brake pad arrangement in a direction axially away from the brake disc when releasing the brake pad from the brake disc.

The wording "caliper" should be understood to mean a structure of the braking arrangement that forms a housing for the components of the braking arrangement. Preferably, the caliper comprises an opening at an upper portion for simplifying maintenance of e.g. the brake disc and brake pad arrangement, etc. Also, the retainer bar may be arranged to extend across the opening at the upper portion. The retainer bar is thus preferably extending across the brake pad arrangement and the brake disc at a position radially outside the brake pad arrangement and the brake disc. The retainer bar may preferably be disconnectable from the caliper by means of e.g. a screw connection. The retainer bar may also be pivotably connected to the caliper, connected to the caliper via another attachments device, such as e.g. a bracket, etc. The retainer bar is preferably arranged as a radial support for a pad holding spring arranged on an opposite side of the brake disc in comparison to the position of the resilient member. Such pad holding spring is arranged to prevent a second brake pad arrangement, to which the pad holding spring is connected, from being twisted out during operation. The second brake pad arrangement is thus arranged on the opposite side of the brake disc in comparison to the brake pad arrangement to which the resilient member is connected.

An advantage of the resilient member of the present disclosure is that the brake pad arrangement can be quickly returned to its non-activated position when the braking action is finished, i.e. when a braking action is no longer needed. Hereby, the risk of so-called drag losses, i.e. when the brake pad slips against the brake disc after releasing the brake, is reduced. As such, wear of the wheel brake arrangement is reduced. Also, a reduction of drag losses will also reduce the fuel consumption as less inertia for rotating the wheel is achieved.

Moreover, the resilient member may also have the secondary function of preventing the brake pad arrangement from moving radially out of the wheel brake arrangement. Hence, a radial force component is present between the resilient member and the retainer bar. As such, the resilient member fulfills also the function of a conventional pad holding spring. A still further advantage is that rattling noise from the brake is reduced.

According to an example embodiment, the brake pad arrangement may comprise a backing plate, the brake pad being connected to a first surface of the backing plate, wherein the resilient member is connected to a second surface of the backing plate, the second surface facing away from the brake pad.

The backing plate, also referred to as a back plate, serves the function of supporting the brake pad.

According to an example embodiment, the resilient member may be a resilient spring, the resilient spring comprising a first and a second spring leg arranged in a V-shaped configuration, wherein the first and second legs are connected to a first and second axially extending side surfaces of the retainer bar, respectively.

Hence, the outer end portions of the respective leg are arranged in the vicinity of the retainer bar. Thus, the inner portion of the V-shaped resilient spring is connected to the brake pad arrangement. Furthermore, the axially extending side surfaces of the retainer bar should be understood to extend in a direction across the brake pad arrangement and brake disc.

According to an example embodiment, the first and second axially extending side surfaces may each comprise a surface normal being perpendicular to a surface normal of the retainer bar facing the brake pad arrangement and brake disc. Thus, the resilient spring is connected to side surfaces of the retainer bar.

According to an example embodiment, the resilient spring may be connected to the first and second axially extending side surfaces by a pre-tension for urging the first and second spring legs in a direction towards each other.

The pre-tension of the resilient spring should be understood such that a distance between portions of the legs when not connected to the retainer bar is smaller than a width of the retainer bar. Thus, in order to attach the resilient spring to the retainer bar, the resilient spring needs to be exposed to an external force increasing the distance between the legs of the V-shape. An advantage of providing the resilient spring in a pre-tensioned state is that an improved connection to the retainer bar is achieved.

According to an example embodiment, the retainer bar may comprise a recess in each of the first and second axially extending side surfaces, wherein the first and second spring legs are positioned in the respective recess. Hereby, axial displacement of the resilient spring is substantially prevented.

According to an example embodiment, the resilient member may comprise a loop portion arranged at a lower end portion of the resilient member, the resilient member being connected to the brake pad arrangement by means of a connecting member connected through the loop portion and into the brake pad arrangement.

The connecting member may preferably be a screw or bolt which is connected through the loop portion and connected to the brake pad arrangement.

According to an example embodiment, the loop portion may comprise a radially extending oval shape. Using a radially extending loop portion will simplify the adjustment of the resilient member when connecting the resilient member to the brake pad arrangement and the retainer bar.

According to an example embodiment, a width of the retainer bar may be smaller at the position connecting with the resilient member compared to a width of the retainer bar at a position axially opposite the brake disc.

Hereby, at least a portion of the retainer bar is more or less arranged in a tapered shape or equivalent, where the width of the retainer bar is decreasing in a direction towards the position of the resilient member. The retainer bar may of course have a relatively uniform width at a first portion across the brake pad arrangement and brake disc, and thereafter, at a second portion decrease in width. An advantage is that there is a reduced risk of tensioning the resilient member in the "wrong" axial direction. Hence, it is further assured that the resilient member will urge the brake bad away from the brake disc when releasing the brake.

According to an example embodiment, the retainer bar may be arranged radially above, and at a circumferentially central position in relation to the brake pad arrangement. Hereby, also the resilient member is arranged at the circumferential central position which will enable for a uniform load distribution on the brake pad arrangement. Hence, the risk of twisting the brake pad arrangement when releasing the brake is reduced.

According to an example embodiment, the retainer bar may be connected to the caliper by means of at least one screw connection element.

According to an example embodiment, the brake pad arrangement may be a first brake pad arrangement, wherein the wheel brake arrangement further comprises a second brake pad arrangement arranged at an axially opposite positon of the brake disc compared to the first brake pad arrangement. The second brake pad arrangement may preferably be non-actuatable, i.e. there is no piston or the like forcing the second brake pad arrangement towards the brake disc during a braking action. The second brake pad arrangement naturally forms a counter part during braking, i.e. the first brake pad arrangement is pressed against the brake disc during braking, whereby the brake disc will be pressed against the second brake pad arrangement. The wheel brake arrangement is thus a so-called floating caliper type brake.

Moreover, the second brake pad arrangement may preferably comprise a pad holding spring as described above.

According to an example embodiment, the caliper may comprise a first caliper part and a second caliper part, the first and second caliper parts comprises a respective portion arranged on a respective axial side of the brake pad arrangement and the brake disc. The first and second caliper parts may thus form the above described opening. The caliper is thus a two-part caliper.

According to an example embodiment, the retainer bar may be connected between the first and second caliper parts. The retainer bar is thus arranged across the opening formed by the first and second caliper parts.

According to a second aspect, there is provided a vehicle comprising a wheel and a wheel brake arrangement according to any one of the embodiments described in relation to the first aspect, wherein the wheel brake arrangement is connected to the wheel.

Effects and features of the second aspect are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
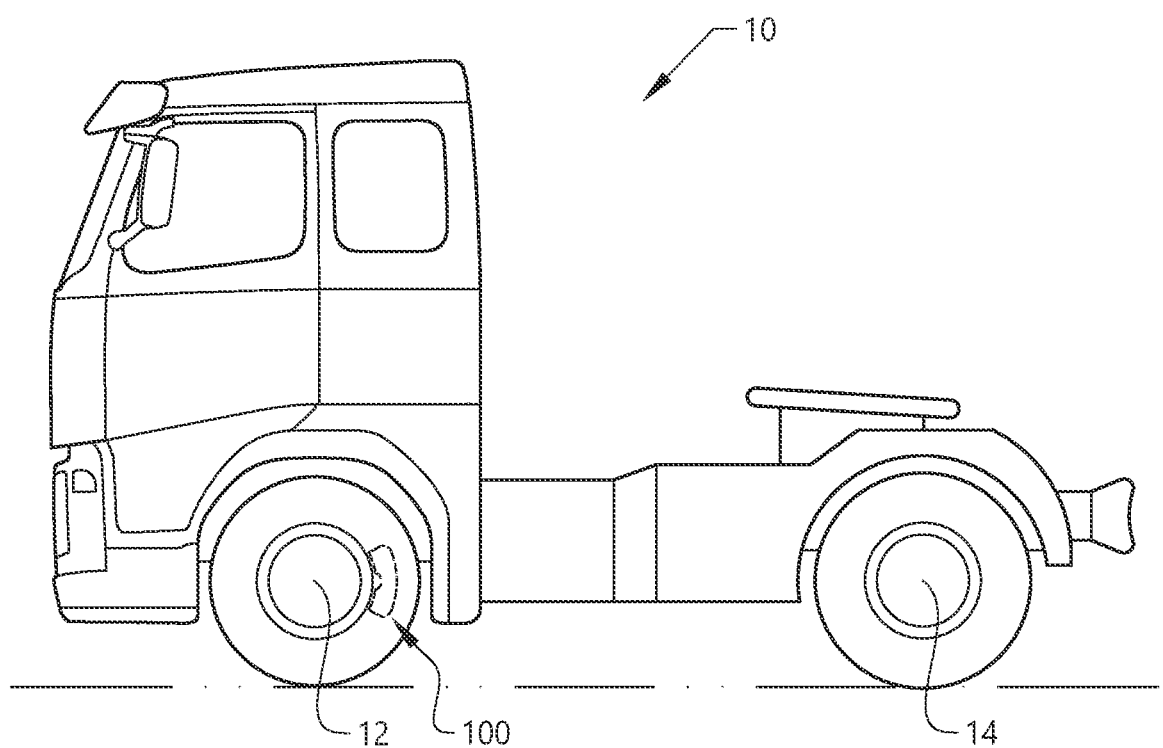
FIG. 1 is a lateral side view illustrating an example embodiment of a vehicle in the form of a truck.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck for which a wheel brake arrangement 100 according to the present disclosure is particularly suitable for. The vehicle 100 comprises a pair of front wheels 12 and a pair of rear wheels 14. Although not depicted in FIG. 1, the vehicle may also comprise further pair of wheels as well. Moreover, as depicted, the front pair of wheels 12 comprises a wheel brake arrangement 100 arranged for controllably reducing the vehicle speed of the vehicle 10. The wheel brake arrangement 100 is operated by means of a controlling a brake pedal arranged in the vehicle compartment, or by means of a suitable control system. Although not depicted, also the rear wheels 14 may comprise a similar wheel brake arrangement 100 as the front wheels 12.

In order to describe the wheel brake arrangement in further detail, reference is made to FIGS. 2-5 which illustrate the wheel brake arrangement according to various example embodiments thereof. Firstly, with particular reference to FIG. 1 in combination with FIG. 2, the wheel brake arrangement 100 comprises a first brake pad arrangement 102 and a second brake pad arrangement 150, each comprising a respective brake pad 104, 104' as well as a respective backing plate 116, 116' arranged as a support for the brake pad. Moreover, a brake disc 106 is arranged between the first 102 and second 150 brake pad arrangements. The brake disc 106 is connected to a wheel (not shown) of the vehicle whereby the wheel brake arrangement 100 is arranged to controllably reduce the rotational speed of the wheel during operation of the vehicle 10.

Moreover, the wheel brake arrangement 100 further comprises a caliper 108 at least partially housing the brake pad arrangements 102, 150, as well as the brake disc 106. As can be seen, the caliper 108 comprises a first caliper part 108' and a second caliper part 108" which are connected to each other. Also, the first 108' and second 108" caliper parts form an opening 111 of the caliper 108. By means of the opening 111, components of the brake pad arrangement are accessible whereby maintenance thereof is simplified.

Figure 4:
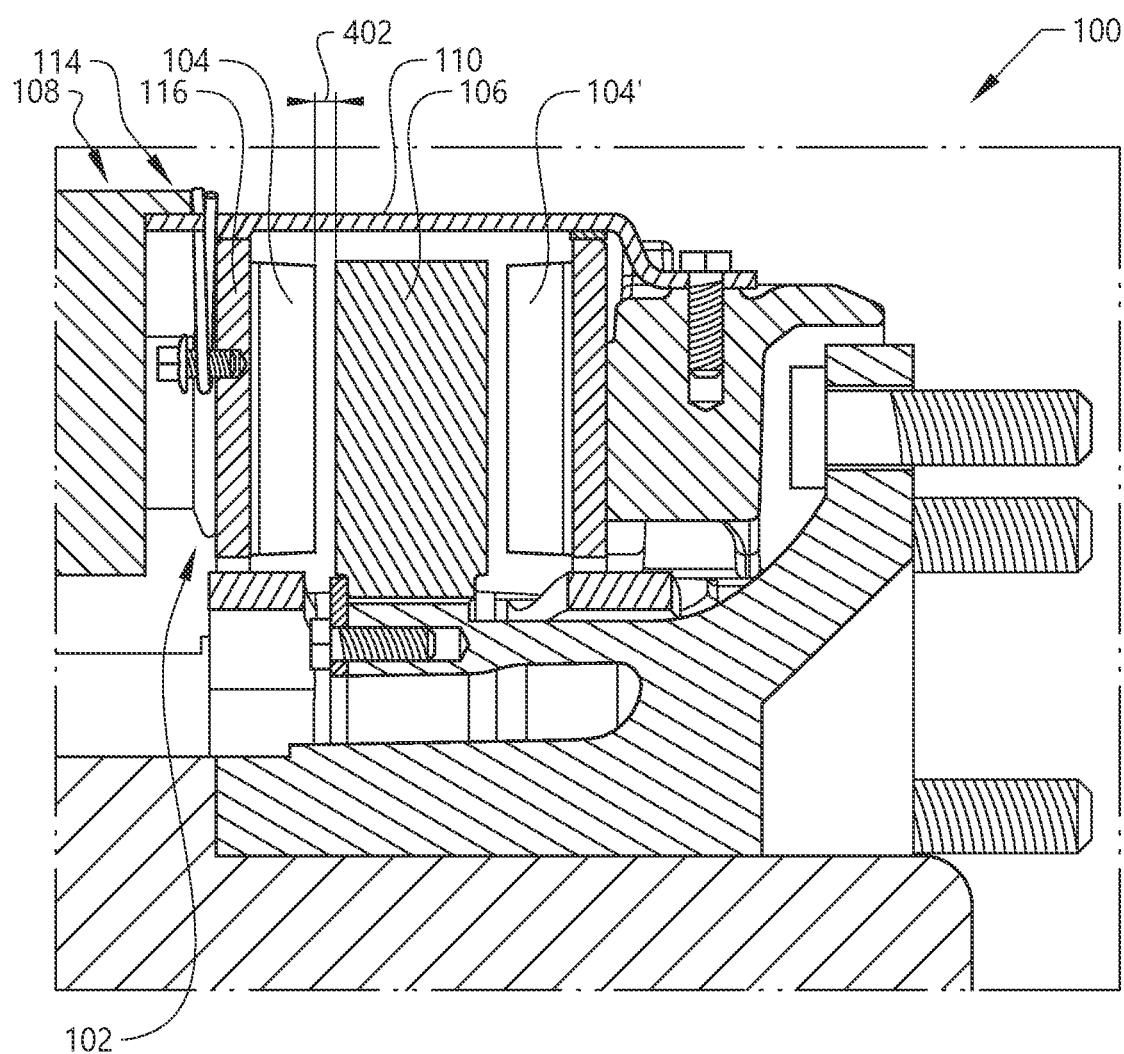
FIG. 4 is a cross section illustrating the wheel brake arrangement according to an example embodiment when not exposing the wheel to a braking action.

Furthermore, the wheel brake arrangement 100 comprises a retainer bar 110. The retainer bar 110 is connected between the first 108' and second 108" caliper parts. In detail, the retainer bar 110 is connected to the second caliper part 108" by means of a screw connection and extends axially across each of the first 102 and second 150 brake pad arrangements, as well as the brake disc 106, thus forming a bridge radially above the opening 111. As is further depicted in FIG. 2, the width, i.e. the extension perpendicular to the axial direction of the wheel brake arrangement, of the retainer bar 110 is smaller in the vicinity of the first brake pad arrangement 102 in comparison to the width in the vicinity of the second brake pad arrangement 150. Moreover, as indicated in FIG. 4, the retainer bar 110 preferably comprises an increased thickness at the position above the backing plate 116 of the first brake pad arrangement 102. Preferably, the increased thickness reduces the risk of assembling the wheel brake arrangement 100 incorrectly.

The wheel brake arrangement 100 further comprises a resilient member 114, in the following referred to as a resilient spring 114. The resilient spring 114 is connected between the first brake pad arrangement 102 and the retainer bar 110. In the example embodiment depicted in FIGS. 2 and 3, the resilient spring 114 comprises a loop portion 136 through which a connecting member 138, here in the form of a screw is connecting the resilient spring 114 to the backing plate 116 of the second brake pad arrangement 102. The resilient spring 114 is thus connected to a second surface 120 of the backing plate 116 which second surface 120 faces away from the first brake pad 104, as well as the brake disc 106.

Figure 2:
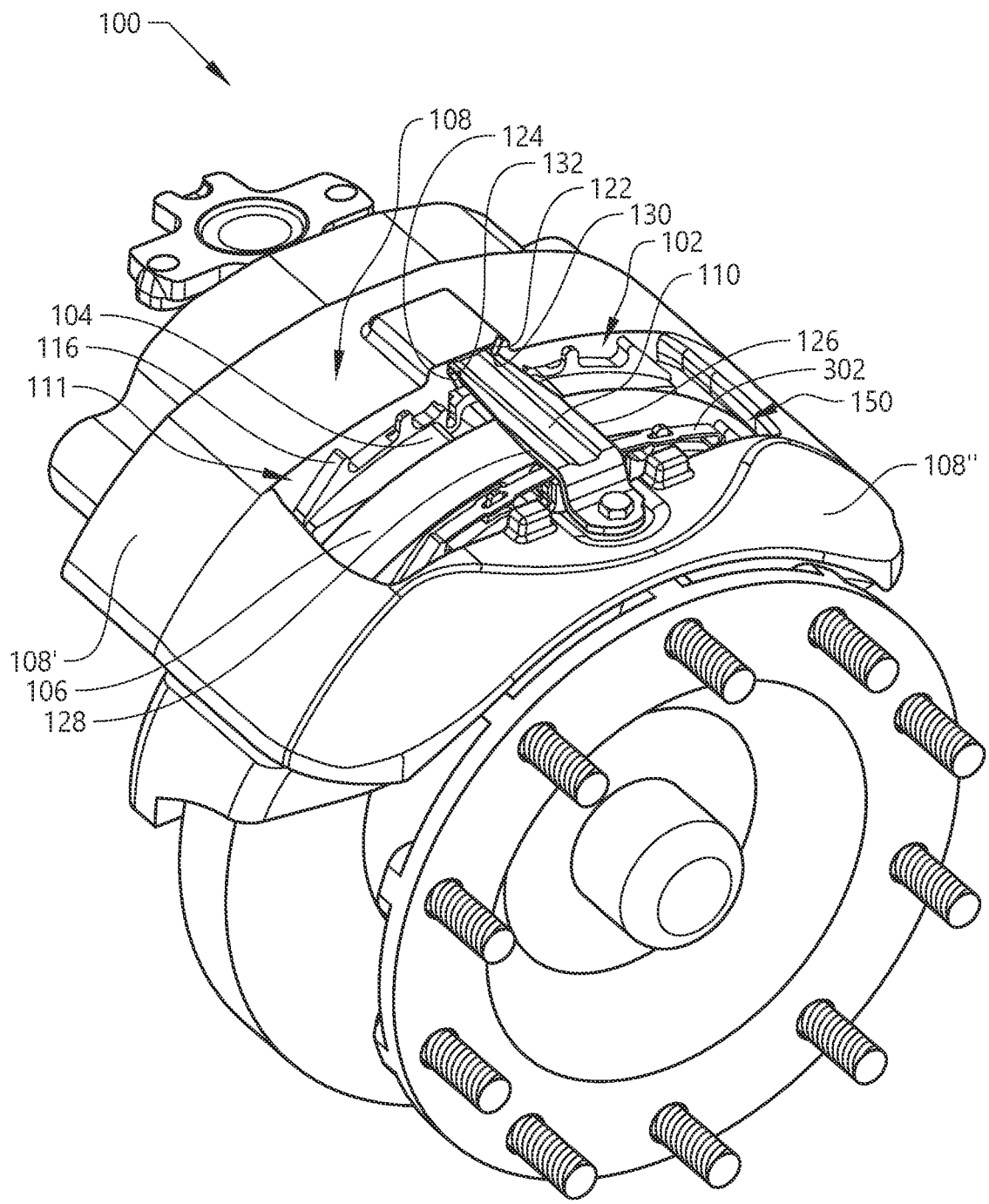
FIG. 2 is a perspective view of a wheel brake arrangement according to an example embodiment.
Figure 3:
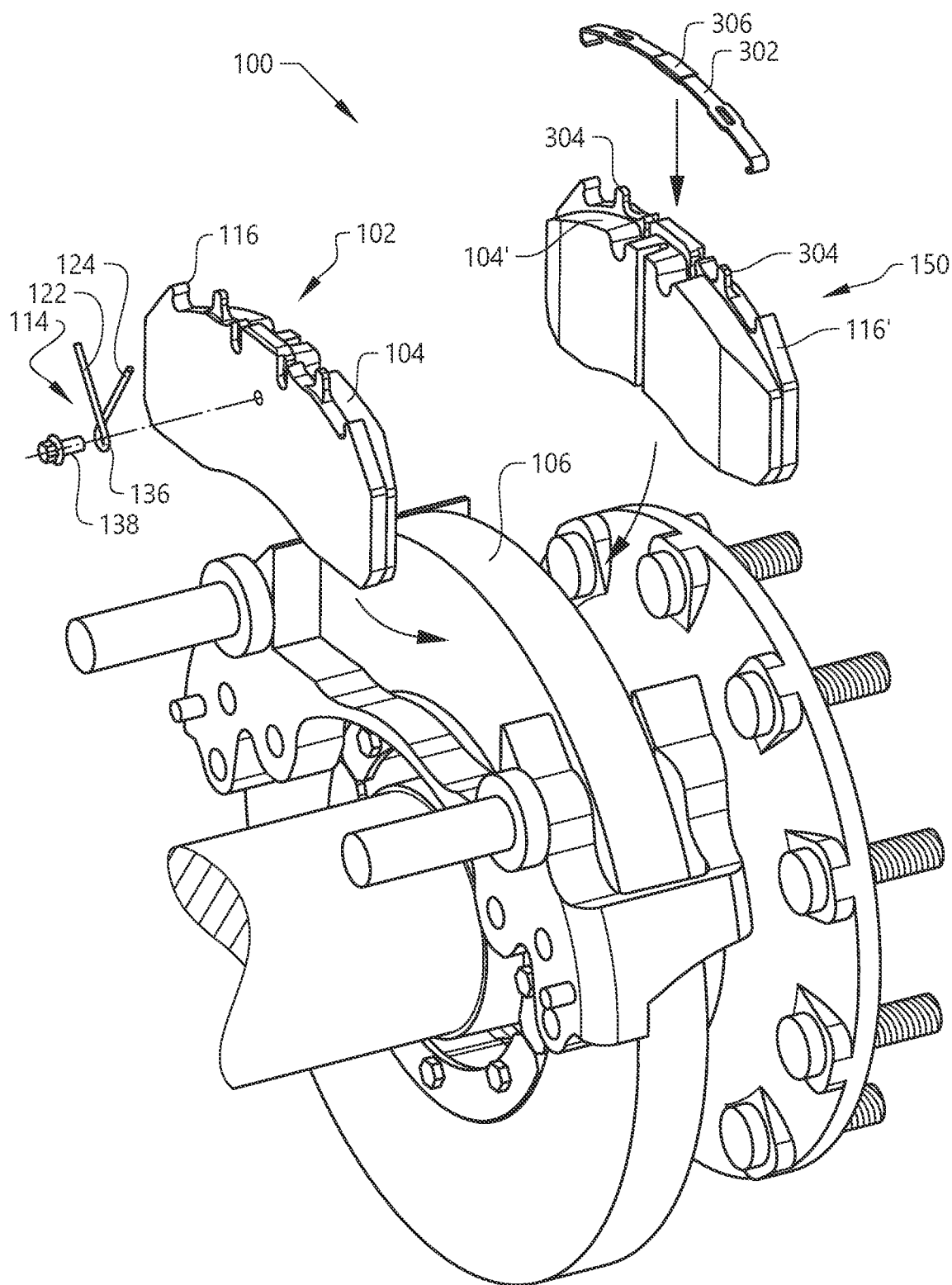
FIG. 3 is an exploded view illustrating components of the wheel brake arrangement of FIG. 2 in further detail.

Moreover, the resilient spring 114 comprises a first 122 and a second 124 spring leg, which are arranged in a V-shaped configuration. The loop portion 136 is thus arranged below the V-shape of the resilient spring 114. The first 122 and second 124 spring legs are connected to a first 126 and a second 128 axially extending side surface of the retainer bar, respectively. As can be seen in FIG. 2, the first 126 and second 128 axially extending side surfaces of the retainer bar 110 each has a surface normal perpendicular to a surface normal facing the brake pad arrangement 102 and brake disc 106. Furthermore, the V-shaped resilient spring 114 is connected to the retainer bar 110 by means of a pre-tension urging the first 122 and second 124 legs in a direction towards each other. Thus, when connecting the resilient spring 114 to the retainer bar 110, a compression force is generated between the first leg 122 and the first axially extending side surface 126 of the retainer bar 110, as well as between the second leg 124 and the second axially extending side surface 128 of the retainer bar 110. Moreover, the first 126 and second 128 axially extending side surfaces comprise a respective recess 130, 132 at the interface connecting with the first 122 and second 124 legs.

Furthermore, the wheel brake arrangement 100 comprises a pad holding spring 302 connected to the backing plate 116' of the second brake pad arrangement 150. The pad holding spring 302 is thus arranged on an opposite axial side of the brake disc 106 compared to the position of the resilient spring 114. The pad holding spring 302 is connected to the backing plate 116' of the second brake pad arrangement 150 by means of two radially extending protruding portions 304 on the upper surface of the backing plate 116'. These protruding portions 304 are arranged in a respective opening 306 of the pad holding spring 302. Furthermore, the pad holding spring 302 comprises a surface portion 306 having a surface normal facing away from the backing plate 116'. The surface portion 306 of the pad holding spring 302 is arranged in contact with the retainer bar 110. Hereby, the retainer bar 110 and the pad holding spring 302 prevent a radially extending motion of the second brake pad arrangement 150.

Figure 5:
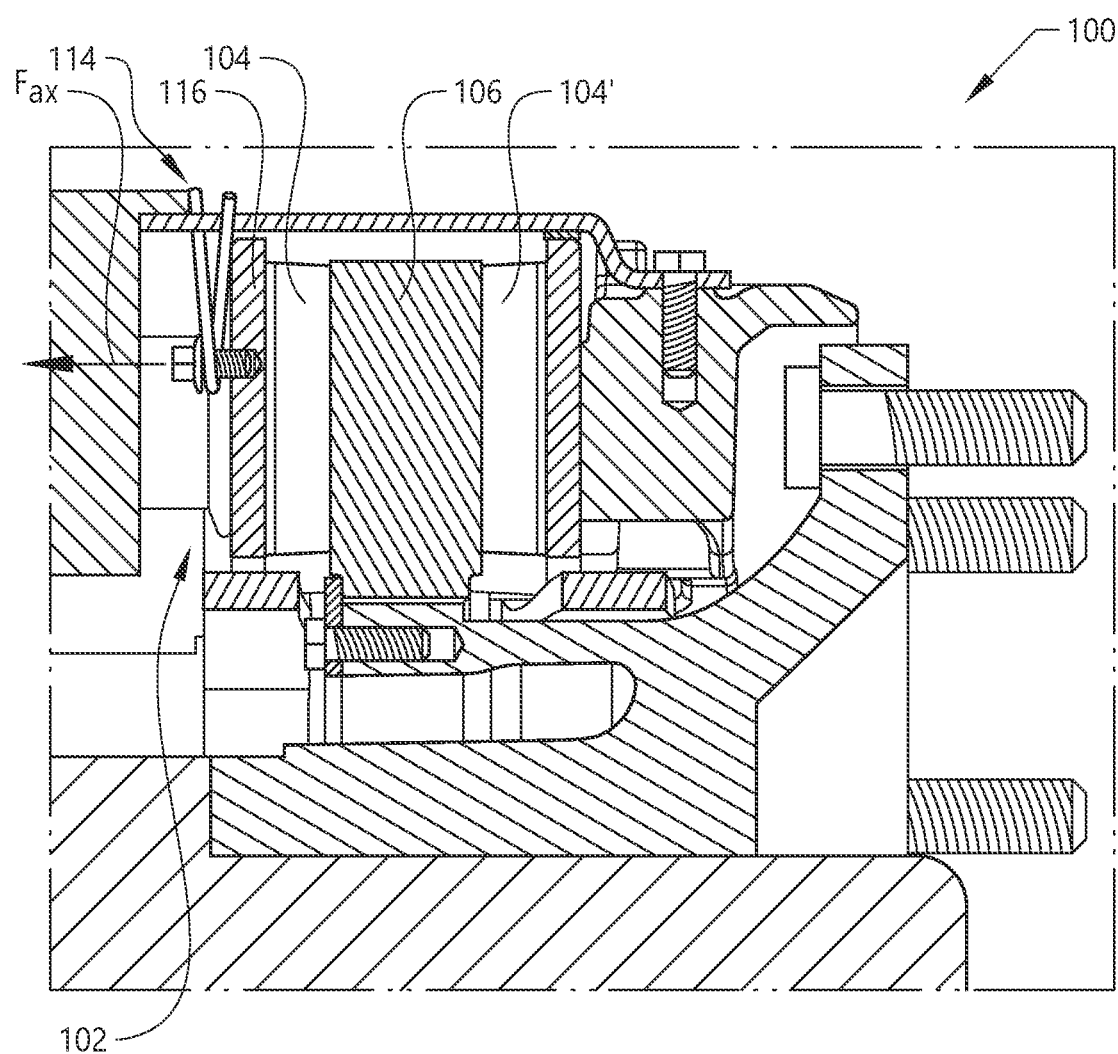
FIG. 5 is a cross section illustrating the wheel brake arrangement according to an example embodiment when exposing the wheel to a braking action.

In order to describe the functionalities of the resilient spring 114 in further detail, reference is made to FIGS. 4 and 5. FIG. 4 illustrates the wheel brake arrangement 100 in a non-braking state where the wheel is free to rotate, while FIG. 5 illustrates the wheel brake arrangement 100 in a braking state where the wheel is substantially prevented from rotating.

Starting with FIG. 4, the brake pad arrangement 102 is not actuated and there is a gap 402 between the first brake pad 104 and the brake 106 such that the wheel is free to rotate. The resilient member 114 is, as described above, connected between the backing plate 116 of first brake pad arrangement 102 and the retainer bar 110. In detail, when the brake is not actuated as illustrated in FIG. 4, there is no, or a small, axial tension in the resilient member 114.

When the wheel brake arrangement 100 thereafter is actuated as depicted in FIG. 5, the brake pad 104 of the first brake pad arrangement 102 is arranged in connection with the brake disc 106 such that the brake pad 104 presses against the brake disc 106 for generating a braking torque. Hereby, the resilient spring 114 has moved the axial distance 402 depicted in FIG. 4. An increased axial tension $F_{ax}$ in the resilient spring 114 has hereby been generated. In detail, a tension $F_{ax}$ in the axial direction away from the brake disc 106 is generated in the resilient spring when applying the brake using e.g. a brake cylinder or other actuating means. The axial tension $F_{ax}$ will urge the first brake pad arrangement 102 in the axial direction away from the brake disc when releasing the brake.

Moreover, since the resilient spring 114 is arranged in the above described V-shape, a force component in the radial direction is also generated when connecting the resilient spring between the first brake pad arrangement 102 and the retainer bar 110. Hereby, the resilient spring 114 also serves the function of preventing a radial motion of the first brake pad arrangement 102 similar to the functionalities described for the above pad holding spring 302.

It is to be understood that the present invention is not limited to the embodiments described above and illustrated in the drawings; rather, the skilled person will recognize that many changes and modifications may be made within the scope of the appended claims. For example, the pad holding spring 302 connected to the second brake pad arrangement 150 may be replaced by a resilient spring 114 similar to the one connected between the first brake pad arrangement 102 and the retainer bar 110.

The invention claimed is:

1. A wheel brake arrangement, comprising:
a first brake pad arrangement and a second brake pad arrangement, wherein the first brake pad arrangement comprises a first backing plate having a first surface arranged to support a first brake pad, and wherein the second brake pad arrangement comprises a second backing plate arranged to support a second brake pad;
a pad holding spring connected to the second brake pad arrangement for preventing radial displacement of the second brake pad arrangement;
a retainer bar extending across the first and the second brake pad arrangements in an axial direction of the wheel brake arrangement, wherein the retainer bar radially supports the pad holding spring; and
a resilient member connected to a second surface of the first backing plate, the second surface facing away from the first brake pad along the axial direction, wherein the resilient member engages with a respective first and second axially extending side surface of the retainer bar such that a radial force component is present between the resilient member and the retainer bar, the first and second axially extending side surfaces extending axially across the brake pad arrangement, the first and second axially extending side surfaces facing in opposite circumferential directions away from each other.

2. The wheel brake arrangement of claim 1, wherein the resilient member extends radially from the second surface of the first backing plate to engage with the retainer bar.

3. The wheel brake arrangement of claim 1, wherein the resilient member is a resilient spring comprising a first spring leg and a second spring leg.

4. The wheel brake arrangement of claim 3, wherein each of the first spring leg and the second spring leg extends radially from the second surface of the first backing plate to engage with the retainer bar.

5. The wheel brake arrangement of claim 3, wherein the first spring leg and the second spring leg are arranged in a V-shaped configuration.

6. The wheel brake arrangement of claim 1, wherein the pad holding spring is connected to the second brake pad arrangement along a circumferential direction of the wheel brake arrangement.

7. The wheel brake arrangement of claim 1, wherein the second backing plate comprises two radially extending protruding portions on an upper surface of the second backing plate, the two radially extending protruding portions connecting the pad holding spring to the second backing plate.

8. The wheel brake arrangement of claim 7, wherein the two protruding portions are arranged in a respective opening of the pad holding spring.

9. The wheel brake arrangement of claim 1, wherein the retainer bar is arranged in a tapered shape with a decreasing width in a direction towards a position of the resilient spring.

10. The wheel brake arrangement of claim 1, wherein the retainer bar comprises a recess in each of the first and the second axially extending side surfaces.

11. The wheel brake arrangement of claim 10, wherein the resilient member engages with the retainer bar at each recess of the first and the second axially extending side surfaces.

12. The wheel brake arrangement of claim 1, wherein the retainer bar comprises an increased thickness at a position radially above the first backing plate.

13. The wheel brake arrangement of claim 1, wherein the resilient member is tensioned when the brake pad is pressed against a brake disc, with tensioning of the resilient member serving to urge the brake pad arrangement in a direction axially away from the brake disc upon cessation of pressing the brake pad against the brake disc.

14. A vehicle comprising a wheel and the wheel brake arrangement of claim 1, wherein the wheel brake arrangement is connected to the wheel.

* * * * *